Oct. 18, 1966          R. H. BODEN          3,279,176
                      ION ROCKET ENGINE
Filed July 31, 1959                    6 Sheets-Sheet 1

INVENTOR.
ROBERT H. BODEN

BY John A. Duffy

AGENT

INVENTOR.
ROBERT H. BODEN

BY John A. Duffy

AGENT

Oct. 18, 1966  R. H. BODEN  3,279,176
ION ROCKET ENGINE

Filed July 31, 1959  6 Sheets-Sheet 5

INVENTOR.
ROBERT H. BODEN
BY John A. Duffy
AGENT

FIG. 14

INVENTOR.
ROBERT H. BODEN
BY John A. Duffy
AGENT

United States Patent Office 3,279,176
Patented Oct. 18, 1966

3,279,176
ION ROCKET ENGINE
Robert H. Boden, Woodland Hills, Calif., assignor to North American Aviation, Inc.
Filed July 31, 1959, Ser. No. 830,855
6 Claims. (Cl. 60—202)

This invention relates to electrical propulsion systems and more particularly to an ion thrust generating device particularly for application to outer space vehicles.

Propulsion systems will play an essential role in the development of space technology. A high thrust propulsion system is necessary to get a vehicle off the earth's surface and to attain escape or orbital velocity. Once escape velocity is attained, the vehicle will ride through the earth's gravity field without additional propulsion. However, once the vehicle attains escape or orbital velocity, supplementary propulsion is necessary to provide a continuous and directional thrust in order to properly navigate the vehicle through space to its ultimate destination.

Planned space vehicles contemplate multistage rocket engines. A typical multistage vehicle has a rocket engine having a thrust requirement varying from 80,000 pounds to over six million pounds. Engine efficiency is relatively unimportant in the first stages. The basic conventional propellant combination used in today's space vehicles is a combination of liquid oxygen and kerosene. The propellant, which is continuously stored in the space vehicle, operates with relatively good performance characteristics with engine efficiency being relatively unimportant. These liquid rocket engines provide the highest potential performance in terms of thrust developed per pound of propellant. Other space engines contemplated are the liquid propellant chemical rocket engine utilizing chemicals to develop a high thrust per unit weight. Additionally, the nuclear rocket engine using atomic power has a high capability and can deliver large payloads and with fewer stages.

While the aforementioned propulsion systems—the liquid propellant, the chemical propellant, and the nuclear propellant—all develop a large amount of thrust per unit weight, each of these systems is limited in scope for short time duration missions such as trips to the moon. The aforementioned high-thrust rocket systems reach their destinations quickly. However, for longer time duration missions, such as a trip to the planet Mars, all of the aforementioned systems have the disadvantage of burning up the propellant in too short a time to accomplish a long mission. For example, a chemical rocket engine generates approximately 400 pounds of thrust for one pound of propellant burned in a given small unit of time. As the desired mission time duration increases, the total amount of propellant needed reaches a point at which the weight of the propellant in the space vehicle becomes prohibitive. Thus, on a typical space mission a freight vehicle weighing 64,000 pounds total is initially boosted to a 300-mile orbit by a chemical or nuclear rocket engine. If chemically powered the vehicle will deliver a 23,000-pound payload. A nuclear rocket will deliver approximately 30,000 pounds. The remainder of the weight is taken up by the propellant. It can readily be seen from the above statistics that for longer missions than Mars the weight required by the propellant becomes greater and greater until an excessive amount is reached.

The forthcoming space travel has created a need for a rocket engine system which will consume a minimum weight of propellant for a long time duration mission. A rocket engine system is needed which burns up a small amount of propellant for a unit of time so that a large payload can be carried for a long duration trip. An optimum value of specific impulse which will yield a minimum total weight of power plant and propellant is that value of specific impulse at which the weight of propellant used over the entire mission is just equal to the weight of the power plant. Specific impulse for reaction engines is equal to the total impulse divided by the weight of propellant over the mission under consideration.

The rocket engine propulsion system of this invention contemplates a high-impulse low-thrust rocket engine system utilizing accelerated ions to develop the rocket engine thrust. Utilizing electrical energy for generating ions and providing a thrust force by accelerating the generated ions between positive and negative charged electrodes of a high potential electrical field, the device of this invention greatly reduces the weight of the space vehicle. The combined weight of the propulsion system and the ion propellant will be a small fraction of the vehicle weight allowing a great amount of payload weight to be carried by the system. The ion rocket engine of this invention develops an optimum specific impulse resulting in weight savings which greatly increase the operability of a propulsion system used in outer space.

According to the device of this invention a propulsion system is provided wherein the production of thrust is produced by accelerated ions. The propulsion means comprise an ion rocket thrust chamber, a source of ion propellant, means for generating ions from the propellant source, means for extracting the ions from the generating means, and means for accelerating the ions to the exhaust velocity desired. In one contenmplated embodiment ions are generated by a surface contact source means wherein the interaction between an ion propellant of low ionization potential and a heated metallic plate having a work function that is large relative to that of the ion propellant generates ions. The generated ions are extracted from the generating means by an array of electrodes provided with electrical energy from a source of high potential electric generating means. The ions produced in the ionization process by the ion generating means develop thrust in the ion thrust chamber by means of an electrical field which subjects the ions to a high potential difference between the ion generating means and an ion accelerator electrode. Ions are extracted from the source and the accelerator electrode accelerates the ions to high velocity, developing a predetermined thrust force. The accelerated ions continue through the thrust chamber on into space, developing thrust for the ion engine. Means are provided to neutralize the space charge produced in the ionization process by the charged ions thrust into space. The space charge neutralization means in a preferred embodiment comprise an electron emitting electrode which ejects electrons from the thrust chamber to be combined with the ions leaving the thrust chamber, thereby neutralizing the ions after they leave the thrust chamber. Included in the system are monitoring means for controlling the efficiency of the engine by monitoring the output of the thrust chamber and controlling the flow of propellant and the value of electrical energy supplied to the thrust chamber in accordance therewith. Decelerating means, which may include an array of accelerating electrodes, may be provided in the thrust chamber of the engine for controlling the velocity and thereby the thrust of the system.

It is therefore an object of this invention to provide an electrical propulsion system for use in space travel.

It is another object of this invention to provide an ion rocket engine.

It is still another object of this invention to provide an ion rocket propulsion system.

It is another object of this invention to provide a high-impulse low-thrust rocket engine.

It is a further object of this invention to provide an ion thrust chamber of symmetrical rectangular geometry.

It is a still further object of this invention to provide an ion rocket engine system having means for neutralizing the space charge thereon.

It is another object of this invention to provide an ion rocket engine system having means for controlling the thrust.

Other objects will become apparent from the following description taken in connection with the accompanying drawings, in which.

The rocket engine of this invention utilizes ions or charged particles to develop the thrust. According to modern concepts, a substance such as a metal is an array of atoms or molecules held in a regular pattern called the space lattice by interatomic forces. As energy is poured into the substance by heating or electrical processes, the interatomic forces are overcome and the substance passes into a liquid, then the vapor state. The atoms consist of a nucleus surrounded by a dynamic array of electrons. The nucleus is a complex entity of protons, neutrons, and electrons. The nucleus has most of the mass of the atom. The lightest nucleus is that of hydrogen, a single proton, which is approximately 1840 times the weight of an electron and of equal and opposite charge. When energy is poured into the atom one or more of the dynamic electrons surrounding the nucleus can be separated from the nucleus. When this occurs the process is known as ionization. The nucleus and its remaining electrons then carry a positive charge equal and opposite to that of the electrons removed and are called an ion. Since the lightest ion is 1840 times the weight of the electron, ions may be used to develop a substantial thrust. When ionization occurs in a gas the resulting cloud of atoms, ions, and electrons is known as a plasma. If there are no atoms left and only ions and electrons are present, the cloud is an ideal plasma. Practice has found it better to separate the ions and electrons, accelerating them individually, and finally allowing the ions to go into outer space. In a preferred embodiment of the device of this invention a metal having a low ionization potential and being relatively heavy is utilized as the ion propellant. Such a metal, for example, is cesium which has the property of having a low ionization potential; that is, the electrons forming part of the atoms of the cesium vapor are more easily pulled off by a cooperating metal with a high work function such as tungsten and the evaporated material consists almost entirely of cesium ions.

Figure 1:
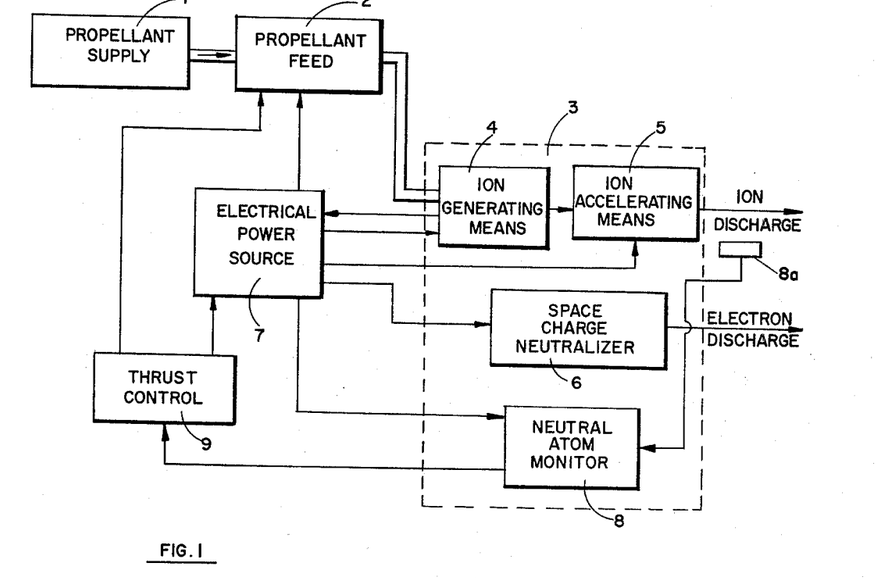
FIG. 1 is a schematic diagram in block form illustrating the operation of the ion propulsion system of this invention.

Referring now to the drawings and specifically to FIG. 1, there is illustrated in block form a schematic diagram of the electrical propulsion system of this invention utilizing an ion rocket engine. In FIG. 1 propellant supply 1 initially stores the propellant. The propellant in propellant supply 1 is selected from a material of high atomic weight which efficiently forms positively charged ions. Alkali metals such as cesium and rubidium, and thorium lend themselves well for this purpose. The propellant in supply 1 is heated to its gaseous or vapor form and fed into propellent feed 2 under pressure. Ion generating means 4 in thrust chamber 3 receives the gaseous propellant from propellant feed 2 and generates a plasma comprising a mixture of neutral atoms, ions, and electrons by the process of ionization. The ions and electrons are extracted from the plasma mixture generated by ion generating means 4 and are accelerated by ion accelerating means 5 by means of a high potential electrostatic field into a high velocity jet which produces substantially all of the thrust in the system. The electrons produced by ion generating means 4 are collected by ion means 4 and fed through electrical power source 7 to the space charge neutralizer 6 which has means for emitting electrons into space at a predetermined rate to balance the positive charge on the ions being discharged into space from ion accelerating means 5. Electrical power source 7 provides the necessary electrical power to heat the propellant in propellant supply 1 to develop a gaseous vapor. Additionally, power source 7 provides the high potential electrical power to ion generating means 4, ion accelerating means 5, and space neutralizer 6 in thrust chamber 3. Neutral atom monitor 8 measures the efficiency of the engine by determining the amount of neutral atoms in the ions being dicharged from ion thrust chamber 3. Monitor 8 may comprise, for example, a probe illustrated at 8a comprising a simple diode measuring device having a tungsten filament as one electrode and an aluminum case as the other electrode. According to the number of neutral atoms which determine the flow of current between the electrodes of the probe 8a of monitor 8, monitor 8 provides control to power source 7 controlling the electrical potential provided to ion thrust chamber 3 and to thrust control 9 which is operatively connected to the propellent feed 2 for controlling the amount of gaseous vapor being produced therein. It is thus seen that an increase in the number of neutral atoms which impinge on the hot or tungsten filament functions to increase the amount of current in monitor 8. Such current is then directed into the electrical power source 7 an thrust control 9, as shown, to respectively control the power input and the quantiy of propellant feed directed into the ion thrust chamber. The electrical power source may comprise, for example, a standard amplifying means which will proportionally increase or decrease the power output to an ionizing electrode of thrust chamber 3 depending on the magnitude of current detected by the probe 8a of monitor 8. The thrust control 9 may comprise a standard solenoid valve, the actuating coil of which is operatively connected to the monitor 8 in order to receive said current therein which is detected by probe 8a. As will be hereinafter more fully explained, the above described increase in current in the monitor 8 automatically functions to increase the current in the actuating coil of said solenoid valve to permit an increase in propellant feed. It should be obvious that the functions of the electrical power source 7 and thrust control 9 may be mutually independent, as above described, or mutually dependent depending on the particular engine requirements. In the normal operation of the engine, it is desirous to have no neutral atoms present in the discharge from the thrust chamber 3, as the presence of neutral atoms indicates that the feed is not being completely ionized. Thus, under ideal operating conditions the percentage of neutral atoms in the ion discharge is some very slight amount, a few thousandths of one percent. The reasons it is desirous to have a very slight amount of neutral atoms formed is that this indicates that not too much power is being directed from the electrical power source 7 to the ion generating means 4. If there were no neutral atoms at all being formed, there would be a possibility that too much power was being used in the engine, thus decreasing the efficiency thereof. When there is an increase in the neutral atoms being discharged, the signal is picked up by the probe 8a of the neutral atom monitor 8. The neutral atom monitor 8 relays the increase in neutral atoms to the thrust control 9. The thrust control 9 does two things in response to the increase in neutral atoms: (1) it increases the power output from the electrical power source 7 to the ion generating means 4 and (2) it reduces the propellant feed rate from the propellant feed 2 to the ion generating means 4. The two steps accomplished by the thrust control 9 serves to reduce the percentage of neutral atoms in the flow from the discharge from the engine. When the percentage of neutral atoms in the discharge approaches zero percent, the neutral atom monitor will relay the decrease to the thrust control which in turn will decrease the electrical power from the power source to the ion generating means and can increase the propellant feed rate from the propellant feed to the ion generating means 4 so that a small fraction of one percent of neutral atoms is being formed at which time the propellant feed rate and electrical power to the ion generating means would stabilize at optimum operating conditions. Normally, an increase in the percentage of neutral atoms present in the ion discharge is accompanied by a decrease in the thrust of the engine. As a result, the thrust control must compensate for the decrease in thrust by increasing the electrical power output from the electrical power source 7 to the ion accelerating means 5. In the case of an increase in thrust there would be a decrease in electrical power to the ion accelerating means 5 until the desired thrust level was obtained. The thrust of the engine may be regulated by increasing or decreasing either, or both, the propellant feed and electrical power to the ion generating means 4. In order to measure the thrust of the engine, the thrust control 9 would incorporate any thrust measuring means such as a conventional accelerometer, for example, to take the necessary measurements of the changes in thrust level. As can be seen, the thrust control 9 will be affected by two variable factors: (1) the change in neutral atoms being produced and (2) the change in thrust of the engine. The affects of the two variables upon the operation of the system are closely interwoven.

Figure 2:
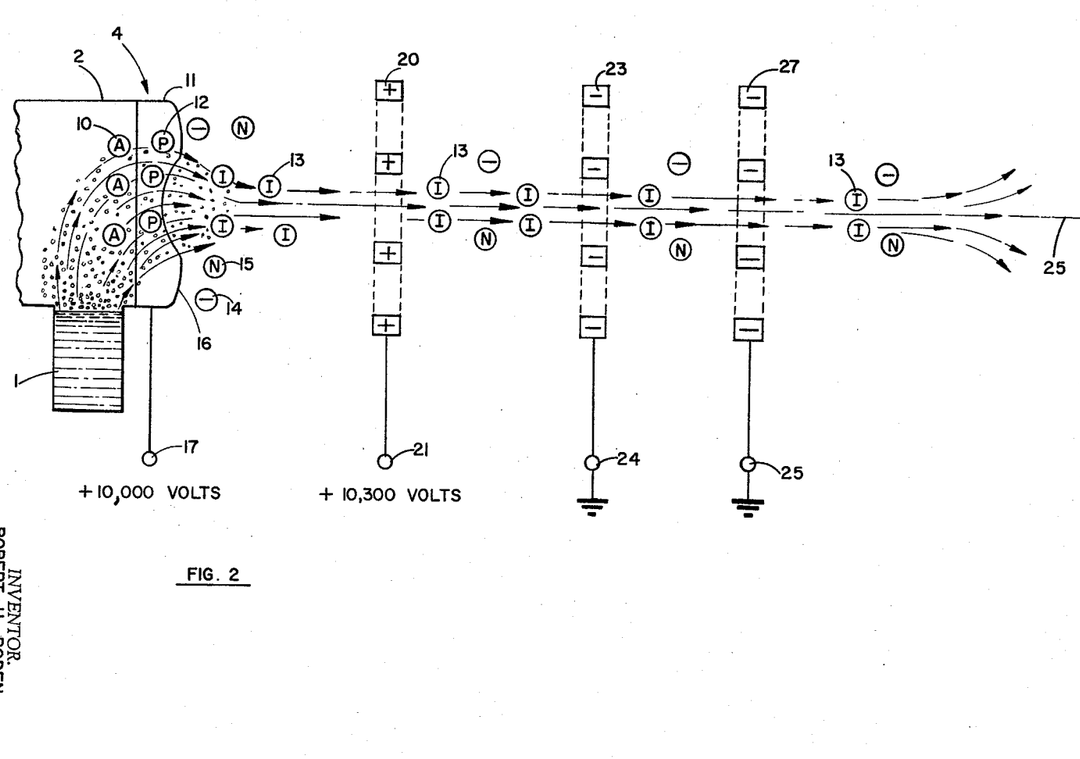
FIG. 2 is a schematic diagram illustrating the functional operation of the thrust chamber of the ion propulsion system of this invention.

Turning now to FIG. 2 there is illustrated in schematic flow diagram the functional operation of the ion engine of this invention. In FIG. 2 propellant supply 1 supplies propellant in gaseous form to propellant feed 2. The gaseous molecules in propellant feed 2 consist of atoms 10. Each atom 10 comprises a nucleus surrounded by a dynamic array of electrons. The nucleus is a complex entity of protons, neutrons, and electrons. The atoms 10 in propellant feed 2 are pressure fed to the input of ionizing electrode 11 of ion generating means 4 and converted into plasma therein. The array of plasma illustrated as 12 in FIG. 2 is created by the process known as ionization. Electrode 11 consists of a highly porous material such as porous tungsten, nickel, or platinum. Electrode 11, having a work function which is greater than the ionization potential of atoms 10 of the propellant, pours energy into atoms 10 and thereby separates one or more of the dynamic electrons surrounding the neucleus of atoms 10. The ionization potential is the amount of energy added to an electron in order to cause the electron to escape. The work function is the amount of energy to carry an electron charge across a metal vacuum boundary. Because of the greater work function of ionizing means 11 than the ionization potential of atoms 10, an electron in each of the atoms 10 escapes therefrom thereby creating ions. The ionization occurring in electrode 11 results in a cloud of neutral atoms, ions and electrons illustrated as plasma 12. It will be assumed that for the purposes of explanation the plasma is not ideal, with ions 13, electrons 14, and neutral atoms 15 being present. The ions generated by ionizing means 11 is extracted from scalloped surfaces 16 of ionizing electrode 11 which are formed to tend to direct the ions 13 toward a focal point. Since an electron has been removed from each of ions 13, the ions have a positive charge thereon. Ionizing electrode 11 is supplied with a high potential from power source 7 shown in FIG. 1 and forms the high potential or anode electrode of the electrostatic field of accelerating means 5 in FIG 1. The voltage fed to terminal 17 of electrode 11 may be, for example, plus 10,000 volts. The most efficient contact between electrode 11 and atoms 10 passing through the porous electrode 11 may be regulated to a comparatively high degree by controlling the temperature and the hole sizes of the porous electrode 11. For example, where electrode 11 consists of a porous tungsten plate approximately $\frac{1}{16}$ inch thick, temperatures in the range of 2,000 to 5,000 degrees Fahrenheit and hole sizes having a diameter not exceeding $10^{-4}$ centimeters have been found more efficient.

The positively charged ions are directed toward focusing electrode means 20 which receives a high positive potential at terminal 21 from electrical energy source 7 of FIG. 1 slightly higher than the potential on electrode means 11. Focusing electrode means 20 additionally serve to focus ions 13 directing them in a parallel path to provide optimum thrust. Thus as ions 13 leave focusing electrode 20 they are traveling in a substantially parallel path. Thrust is generated in accelerating means 5 (FIG. 1) by accelerating ions 13 between focusing electrode 20 and accelerating electrode means 23. An electrostatic field is created between focusing electrode means 20 and accelerating electrode means 23 by connecting the negative or ground terminal of electrical energy source 7 (FIG. 1) to terminal 24 of accelerating electrode 23. A potential difference between focusing electrode means 20 and accelerating electrode means 23 develops the accelerating thrust. By reason of the positive charge on ion 13 and the high negative potential on accelerating electrodes 23, a large accelerating thrust force is developed between focusing electrode means 20 and accelerating electrode means 23. The ions flow in a path substantially parallel to thrust axis 25 between focusing electrode means 20 and accelerating electrode means 23 because of the initial parallel direction of ions 13 provided by focusing electrode means 20. Ions 13 are accelerated between focusing electrode means 20 and accelerating electrode means 23 into a high-velocity jet stream which produces most of the thrust of the engine. In addition to ions 13, neutrals 15 also pass through focusing electrode means 20 and accelerating electrode means 23. Electrons 14 are collected by ionizing electrode means 11 which has a high positive potential. Electrons 14 then pass into the electrical system of electrical energy source 7. Few, if any, electrons escape from ionizing electrode means 11 and pass through focusing electrode means 20 and accelerating electrode means 23.

Ions 13, as they are discharged into space, still contain a positive charge and therefore provide a positive space charge in the region of space near the discharge end of ion thrust chamber 3 of FIG. 1. If not compensated for, this positive space charge would tend to decelerate the thrust means and draw the ion engine back into space and therefore offset the thrust of the engine. The electron emitter means 27, receiving electrical energy from source 7 of FIG. 1 at terminal 25, emits sufficient electrons by means of thermionic emission or field emission principles well-known in the electronics art. The electrons mix with the positively charged ions 13 in space thereby providing zero space charge.

Figure 3:
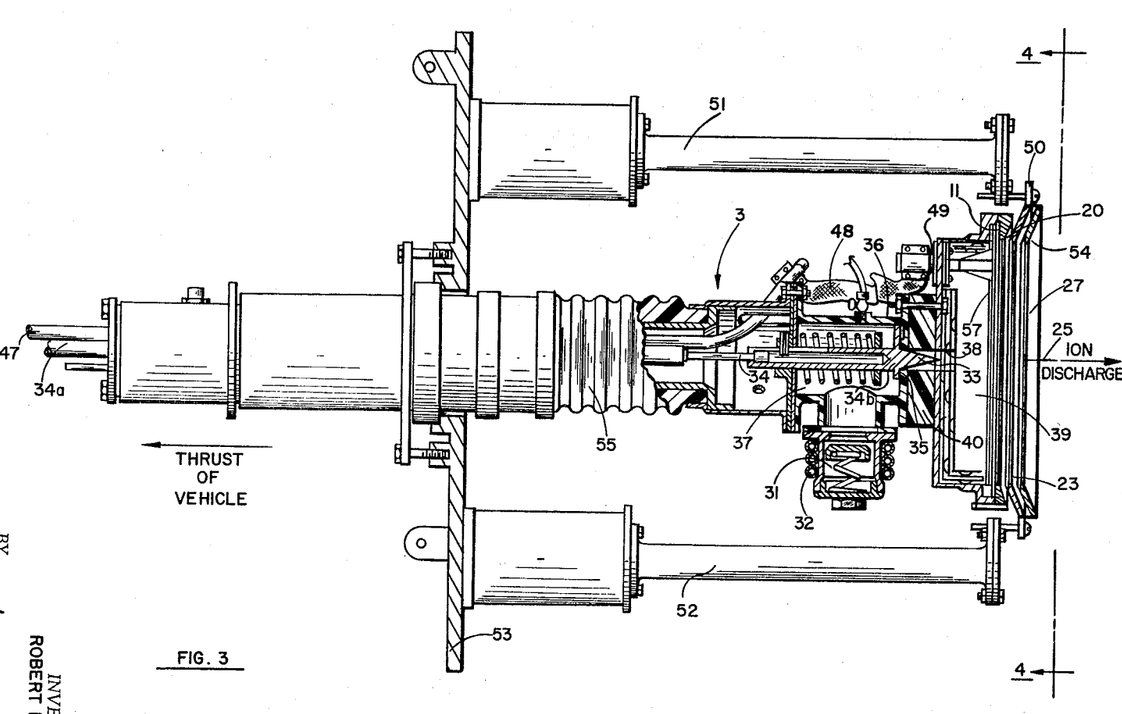
FIG. 3 is a cross-sectional view of a preferred embodiment of the rocket engine of this invention.

Turning now to FIG. 3, there is shown a cross-sectional view of the preferred embodiment of the ion engine of this invention. Ion thrust chamber 3 is connected to receive propellant from propellant supply 1 consisting of boiler 31. The propellant is changed from the liquid into a gaseous or vapor form in boiler 31, being heated to a predetermined temperature by appropriate heating coils 32 located around boiler 31. Propellant vapor is conducted by a pressure differential from boiler 31 into propellant feed 2 which may consist of cylindrical chamber 37. Pressure valve 33, having a control rod 34, controls the flow of gaseous propellant into thrust chamber 3. One end of the control rod 34 has an outer portion 34a comprising an extended portion of a solenoid valve plunger which is operatively included in a standard solenoid valve assembly, as hereinbefore stated, to receive automatic control from thrust control 9 (FIG. 1). The control rod 34 further comprises an inner portion 34b shaped to fit in valve seat 35. Insulator 36, which may consist of, for example, alumina or boron-nitride insulation, serves to maintain chamber 37 at the predetermined high temperatures desired. Gaseous propellant, at a predetermined pressure determined by the temperature of the propellant in chamber 37, is supplied to ionizing electrode means 11 through valve opening 38 into chamber 39 of propellant feed 2. Rectangular chamber 39 is insulated from chamber 37 by insulator 40 which prevents undue radiation losses of the heat in chamber 37. Ionizing electrode means 11 forms the right-hand wall of ionization chamber 39 and the left-hand or thrust end wall of thrust chamber 3. Electrode 11 consists of a rectangular porous plate constructed from a metal having a high work function and capable of withstanding high temperatures, such as tungsten or platinum, formed to receive the gaseous propellant from propellant feed 2. The pressure of the gaseous propellant in chamber 39 causes a diffusion of the gas through porous ionizing electrode 11 where ionization occurs, as previously described. Located a relatively short longitudinal distance from ionizing electrode 11 and constructed parallel thereto is focusing electrode means 20 of rectangular form to be described further in relation to FIG. 5. Accelerating electrode means 23 is located a predetermined distance from focusing electrode means 20 and emitter electrode means 27 is located a predetermined distance from accelerating electrode means 23 (more particularly shown in FIG. 5). Electrical power is provided by electrical lead 47 comprising a high voltage cable extending longitudinally through the ion engine and terminating in the vicinity of propellant feed 2 where it is attached to a plated electrical bus bar 48. Bus bar 48 has one end appropriately connected to cable 47 to receive the positive potential of electrical power from electrical energy source 7 and the other end connected to provide the high potential to ionizing electrode 11. Appropriate electrical shielding is provided between electrical bus bar 48 and the remainder of the engine. Because of the high potentials, near 10,000 volts, contemplated, electrical bus lead 48 must be highly insulated. For this, insulating material 49 is provided. Accelerating electrode 23 and emitter electrode 27 are connected to ground by being connected to frame 50 of the ion engine. Electrical bus bar 48 is also connected to provide electrical power to strip heating element 57 which heats ionizing electrode 11. Frame 50 consists of standoff bars 51 and 52 located at the upper and lower ends respectively of the frame. One end of bars 51 and 52 is connected to plate 53 forming the left-hand end of the frame and the other end of standoffs 51 and 52 are connected to frame 50. Frame 50 includes focusing electrode 20. Frame 54 encloses electrodes 23 and 27 and anchors the discharge end of thrust chamber 3. Control rod 34 and electrical leads 47 are further insulated in the remainder of the engine by insulation conduit 55 circumferentially wound around the cables to provide electrical and heat insulation.

Figure 4:
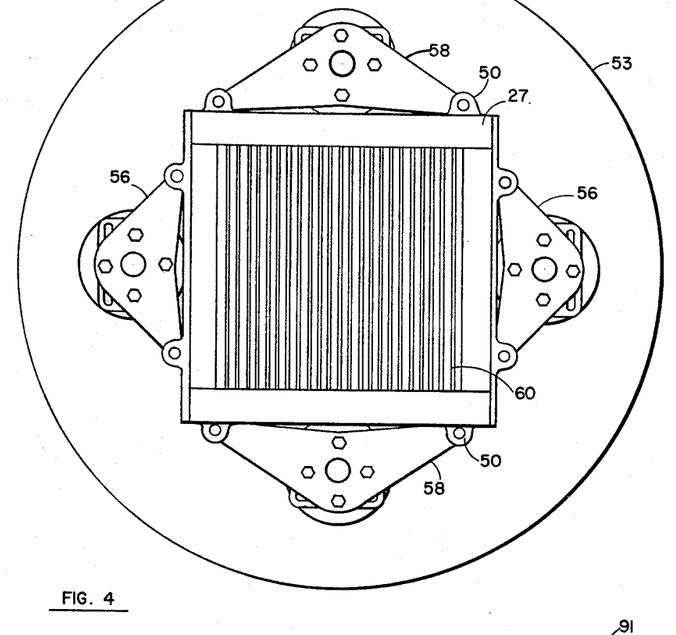
FIG. 4 is an end view of the cross-sectional view of FIG. 3.

Referring now to FIG. 4 there is shown an end view 4—4 of the cross-sectional view of FIG. 3 of the ion engine of this invention. As illustrated in FIG. 4, plate 53, anchoring the thrust end of the ion engine, may be, for example, of circular construction. Plate 53 may be adapted to be connected to a space vehicle structure. As seen in FIG. 4, electron emitter electrode 27 is attached to the frame by means of plates 56. Similarly, accelerating electrode 20 is attached to the frame of the engine by plates 58. Emitter electrode 27 is of rectangular structure, preferably square, having a plurality of bars 60 parallel and equally spaced. Accelerating electrode 23 and focusing electrode 20 (not shown in FIG. 4) are similarly constructed of parallel and equally spaced bars, or strips, which are in line with bars 60. Electrodes 11, 20, 23, and 27 are symmetrical about the thrust axis. The rectangular geometry illustrated in FIG. 4 is particularly adaptable to prevent undesirable bombardment of structure from ions generated by ionizing electrode 11. The inherent symmetrical construction of the rectangular structure with the straight lines and square corners avoids complex field interaction which would be encountered with a circular aperture.

Figure 5:
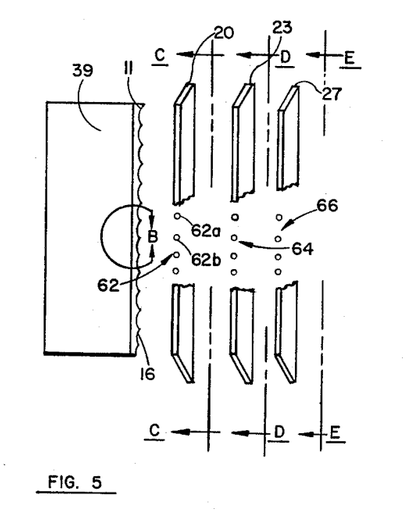
FIG. 5 is a cross-sectional exploded view of the thrust chamber of FIG. 3.

Referring now to FIG. 5, there is shown in exploded view the thrust means of the ion engine illustrated in FIG. 3. As shown in FIG. 5, chamber 39 contains gaseous propellant at a predetermined pressure. Ionizing electrode 11, heated to high predetermined temperature, receives the gaseous propellant through porous openings therein, generates ions which are extracted from scalloped surfaces 16 of ionizing electrode 11 by focusing electrode 20 located a predetermined distance to the right of ionizing electrode 11. As shown in FIG. 5, focusing electrode 20 consists of a plurality of equally spaced parallel bars 62 which are spaced to receive the ions from ionizing electrode 11 and to focus them between each of the bars, for example bars $62_a$ and $62_b$. Each of bars 62 are connected to receive an equal potential and are spaced to allow ions to flow between each of the plurality of pairs of bars. The electrostatic field is greatly strengthened by the comparatively short distances between electrode 20 and electrode 11. Focusing electrode 20 provides a focusing point from which the ions may be accelerated and prevents ions from deviating from the normal thrust vector which is parallel to the axis of the engine in the direction of travel of the space vehicle with which the ion engine is associated. The ions passing through focusing electrode 20 are accelerated, developing thrust, by the difference of potential between focusing electrode 20 and accelerating electrode 23. Accelerating electrode 23 consists of a plurality of bars or strips 64 equally spaced and aligned with bars 62 of focusing electrode 20. Each of bars 64 is connected to receive an equal potential (ground). The ions focused by the bars 62 of focusing electrode 20 are accelerated in parallel lines through bars 64 of accelerating electrode 23. Emitter electrode 27, located a predetermined distance to the right of accelerating electrode 23, consists of a plurality of bars 66 equally spaced and symmetrically aligned with bars 64 of accelerating electrode 23 and bars 62 of focusing electrode 20. Each of bars 66 is connected to receive an equal potential (ground). The accelerated ions pass through emitter electrode 27, are decelerated to desired velocity and pass into space being combined with the electrons emitted by bars 66 of emitter electrode 27. Thus as seen in FIG. 5 a symmetrical arrangement of ionizing electrode 11, focusing electrode 20, accelerating electrode 23, and decelerator-emitter electrode 27 provides a path parallel to the axis or direction of travel of the space vehicle for the ions through the ion engine thereby maintaining an optimum thrust on the engine.

Figure 6:
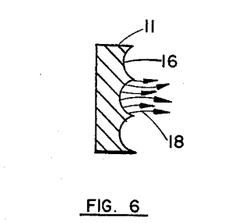
FIG. 6 is an enlarged sectional view of the ion generating means illustrated in FIG. 3.

As shown in FIG. 6, which is an enlarged sectional view B of the ionizing electrode 11 illustrated in FIG. 5, the outer portion of ionizing electrode 11 whence the ions are emitted has surfaces 16 consisting of scalloped or curved surfaces formed in such a way that when the ions are emitted from ionizing electrode 11 and drawn toward focusing electrode 20 their path of travel is normal to the surfaces 16 as shown by arrows 18. Thus it can be seen from FIG. 6, the ions emitted from ionizing electrode 11 are directed focally toward focusing electrode 20. In this manner the ions are focused and directed along a parallel path through the thrust chamber of the ion engine.

Figures 7, 8, 9, 12:
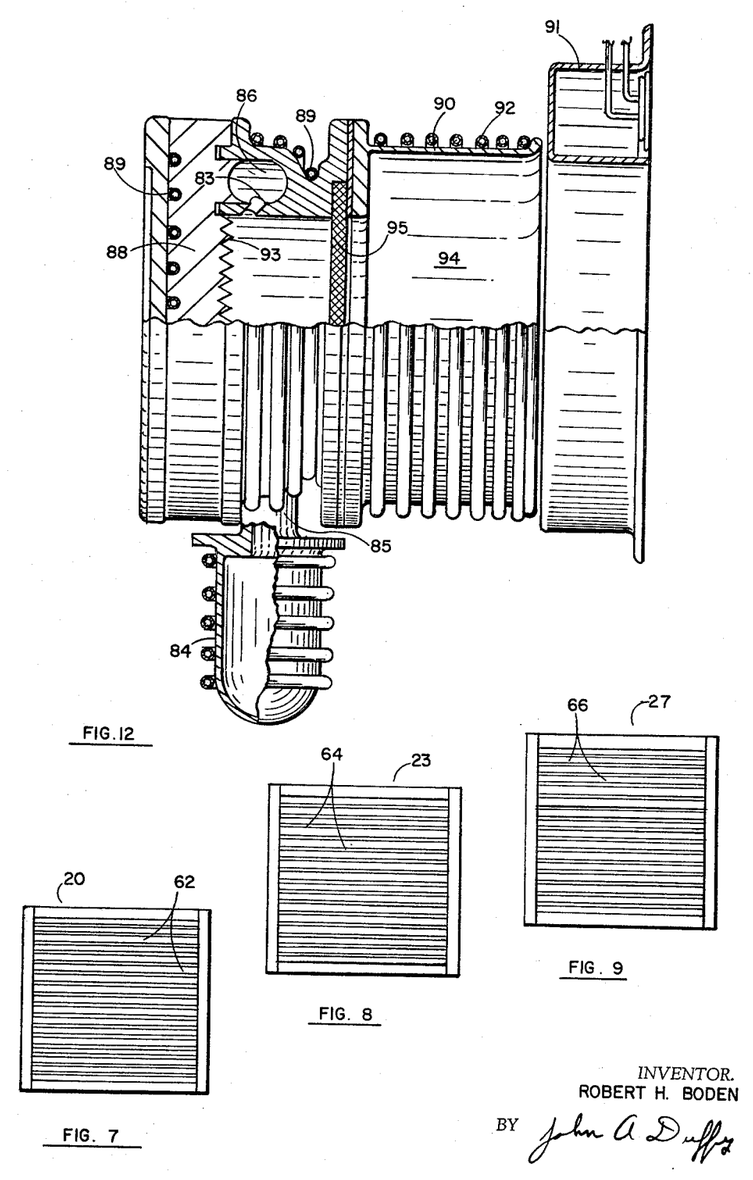
FIG. 7 is a section taken from FIG. 3 illustrating the focusing electrode means.
FIG. 8 is a section of FIG. 3 illustrating the accelerating electrode means.
FIG. 9 is a section illustrating the electron emitter electrode means of FIG. 3.
FIG. 12 is an alternative embodiment of the device of this invention showing a cylindrical geometry thrust chamber.

FIGS. 7, 8, and 9 illustrate the rectangular geometry of focusing electrode 20, accelerating electrode 23, and emitter electrode 27. In FIG. 7 focusing electrode 20 has a plurality of horizontal bars 62 spaced equidistantly along the surface of focusing electrode 20. Each of the bars receives an equal high potential so that ions emitting from ionizing electrode 11 pass equally between the bars 62. The exact physical dimensions of the bars and spacing is determined by the design parameters of the ion engine. FIG. 8 illustrates the rectangular geometrical structure of accelerating electrode 23, and FIG. 9 illustrates the geometrical structure of emitter electrode 27. Bars 64 of the accelerating electrode 23 and bars 66 of the emitter electrode 27 are horizontally formed and equally spaced as are the bars of focusing electrode 20. Bars 62, 64, and 66 of focusing electrode 20, accelerating electrode 23, and emitter electrode 27 are spaced in relation to each other in order that the ions may be directed along a straight path through the electrodes. The rectangular geometry of the electrodes illustrated in FIGS. 7, 8, and 9 permits a compact engine design and uniform flow of ions over the entire thrust surface. The rectangular spacing allows the ions near the upper portion to be efficiently drawn through the ion chamber as well as in the center portion.

Figure 10:
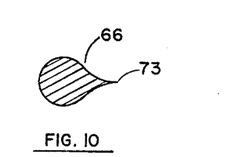
FIG. 10 is a view taken from the enlarged sectional view of FIG. 5 illustrating the particular structure of the electron emitter electrode.

Emitter electrode 27, which emits the electrons which are combined with the positively charged ions in outer space, has its bars 66 shaped in such a manner as particularly illustrated in FIG. 10 which shows one bar. Each bar cross-section is shaped in the form of a teardrop to have a sharp edge extending longitudinally over the entire cross-section, or alternatively a series of sharp points having scalloped edges, for example point 73 in FIG. 10, extending into outer space. In this manner electrons are emitted from point 73 in a more efficient maner by use of thermionic or field emission principles to be combined with positively charged ions in outer space.

Figure 11:
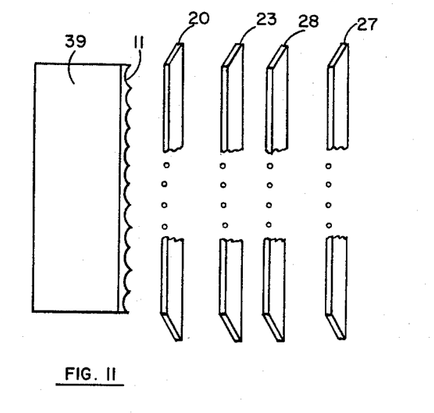
FIG. 11 is a cross-sectional view of an alternative embodiment of this invention illustrating a decelerating electrode means.

Referring now to FIG. 11, there is shown an alternative embodiment of the device of this invention illustrating means for controlling the velocity of the ions. In FIG. 11 there is shown the ionization chamber portion of the device illustrated in FIG. 3, in an exploded view to better illustrate the operation of the system. In addition to the ionizing electrode, focusing electrode, the accelerating electrode, and emitter electrode, decelerating electrode means 28 is provided and consists of horizontally spaced bars symmetrically aligned with the bars of the preceding focusing, accelerating, electron emitter electrodes. Decelerating electrode 28 is suitably mounted to the remainder of the ionizing chamber and electrically insulated. Electrodes 27 and 28 may be attached to skin of vehicle at ground potential. Electrodes 27 and 28 can be combined in one unit. Power source 7 (FIG. 1) is connected to supply decelerating electrode 28 with a potential which is between the high potential of the focusing electrode and the ground potential of the accelerating electrode depending on the thrust velocity desired. The purpose of decelerating electrode 28 is to control the velocity of the ions. The potential on decelerating electrode 28 may be varied relative to accelerating electrode 23 by means (not shown) in order to raise or lower the velocity of the ions as they leave the thrust chamber. For example, power source 7 in FIG. 1 may be connected through suitable switch or potentiometer means to present a varying potential to electrode 28. An optimum exhaust velocity for a vehicle on a short space mission would be a comparatively low velocity which can be achieved with a decelerating electrode having a comparatively high potential relative to accelerating electrode 23. On the other hand, for a long mission wherein a high velocity ion thrust is required, the decelerating electrode would be at a comparatively small difference from or near the accelerating electrode potential.

Figure 13:
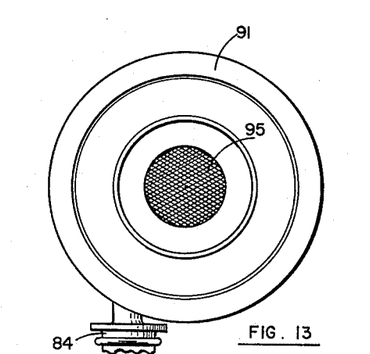
FIG. 13 is an end view of the circular embodiment of FIG. 12.

FIG. 12 illustrates an alternative embodiment of the invention wherein acceleration of the ions is developed in a circular geometry thrust chamber. Propellant boiler 84 containing propellant in a liquid form vaporizes the propellant which is fed to propellant feed 85 to a gaseous form. The gaseous propellant passes to an annular manifold 86 in the ionization chamber body 87 in which are included a series of propellant nozzles 83. Nozzles 83 direct the gaseous propellant vapor against an ionizing means comprising serrated plate 93 of plate 88 of cylindrical geometry and of a metal having a high work function, such as tungsten. Plate 88 is heated to a predetermined temperature by heater elements 89. Plate 88 produces ions from the vapor propellant in a manner similar to that described for the ion engine illustrated in FIG. 3. The plasma generated by contact with plate 93 is separated and ions and electrons are accelerated through diffusion chamber 94 toward an accelerating electrode 90 continuing through electron emitter electrode 91 and then on into space. Porous plate 95 may be utilized alternatively to generate ions instead of serrated plate 93. In the embodiment illustrated in FIG. 12 ionizing chamber 94 is supplied with a high potential wherein accelerating electrode 90 is supplied with a ground potential. Thus the ions produced by ionizing electrode 88 are positively charged ions which are accelerated toward a negatively charged accelerating electrode 90. Coolant lines 92 are provided to keep accelerating electrode 90 from getting too hot because of the electron bombardment. In FIG. 13, an end view of the embodiment of FIG. 12, the circular geometry of the thrust chamber is seen.

Figure 14:
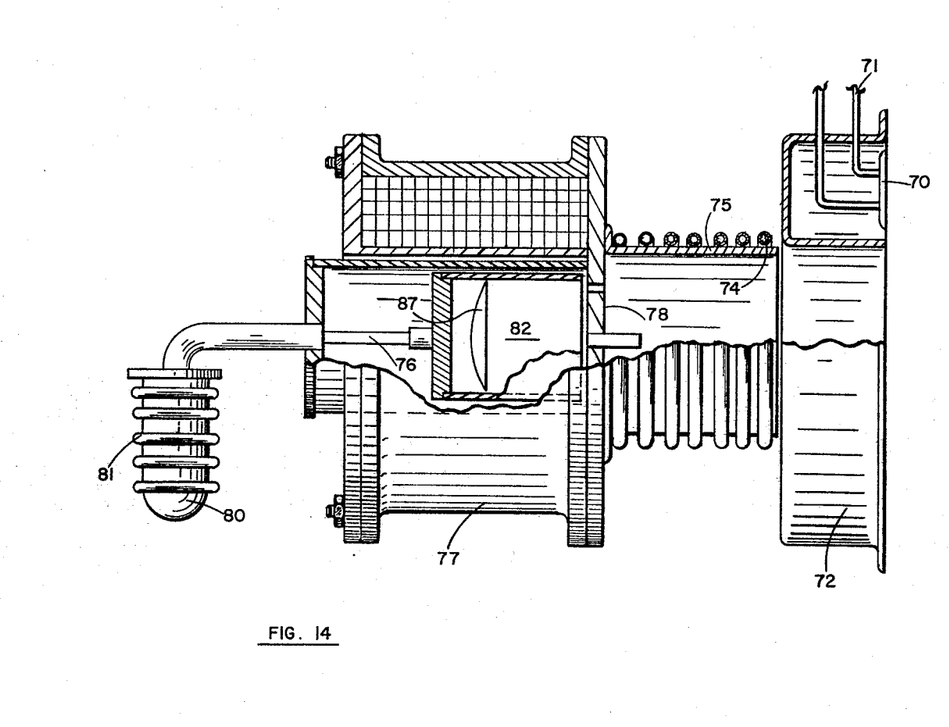
FIG. 14 illustrates another embodiment of the invention showing an arc type means for generating ions.

In the thrust chambers illustrated in the embodiment of FIG. 3 and FIG. 12 ions are accelerated by an electrostatic field with the ions being focused by focusing electrode 20 in the embodiment illustrated in FIG. 3. FIG. 14 illustrates an alternative embodiment showing an ion rocket engine of circular geometry wherein generation of the ions is developed by a combination of electric and magnetic fields. Propellant boiler 80 generates gas from a liquid propellant by means of a heater 81. The gas is conducted by a pressure differential from propellant boiler 80 into an arc chamber 82. The pressure, temperature and area of boiler 80 are adjusted to produce a predetermined required flow of gas. Ions are generated within arc chamber 82 by collisions between electrons and atoms of the propellant gas which flows into the arc chamber under a predetermined pressure. Electrons for ion production are generated by an electrode 87. Electrical power for generation of electrons and coolant for control of the temperature of cathode electrode means 87 are supplied to cathode 87 through concentric electric power and coolant lines 74. Electrons are directed toward a perforated accelerating electrode 78 which serves as the electron target. A potential difference is maintained between the cathode and the target. This potential difference imparts velocity to the electrons which collide with the atoms of the propellant vapor in arc chamber 82 thereby ionizing these atoms. Electrons are collimated and directed in an efficient manner by a cooled arc magnet means 77. Electron motion in arc chamber 82 is not influenced by the magnetic field created by magnet 77 if the flow velocity of electrons is parallel to the center line or axis of the thrust chamber in chamber 82. The plasma created in arc chamber 82 consisting of ions, electrons, and neutral atoms or molecules flows under a pressure differential between arc chamber 82 and outer space through the perforated accelerating electrode 78 into the closed end of a high voltage electrode 75. Electron bombardment of accelerating electrode 78 results in a heating thereof requiring a cooling through cooling lines 74. Electrons are collected by the accelerating high voltage electrode 75 which is maintained at a high potential positive with respect to a ground electrode 72. The collected electrons pass to the main electrical power generator of the ion rocket engine system through electrode 75 which is connected to a high potential terminal of the power generator. Ions are extracted from the plasma and accelerated through ground electrode 72 developing thrust. Ground electrode 72 is a rectangular toroid open on one face to receive thermionic electron source 71. Electrode 72 may be fabricated from a material having a high work function. That is, electrons are emitted from electrode 72 with comparative ease upon application of a source of electrical energy. Electrode 72 acts as a shield to prevent back flow of electrons to accelerating high voltage electrode 78 and other parts of the thrust chamber which are maintained at a high voltage, positive with respect to ground electrode 72. All electrons collected on high voltage electrode 78 pass through the electrical power system and are emitted from electron emitter electrode 70 which is maintained substantially at the same potential as ground electrode 72.

The arc-type ion source illustrated in FIG. 14 differs from the embodiments illustrated in FIG. 3 and FIG. 12 in that ions are generated by collision between accelerated electrons and atoms, while in the embodiments disclosed in FIGS. 3 and 12 ions are generated by surface contact ionization of the ionizing electrode.

The ion engines illustrated in FIGS. 3, 12, and 14 may be incorporated in a rocket space vehicle or combined with chemical or nuclear rockets to provide efficient space travel. A major advantage of the ion engine as disclosed herein is the very low fuel to thrust ratio. Although for short trips (within Mars orbit) space travel utilizing ion engines takes more time than that for rockets of space vehicles using chemical or nuclear rockets, the time differential diminishes with distance. The ion engine operates with a low weight fuel and can drive a vehicle for many times greater travel distances than chemical or nuclear rockets.

The ion engines disclosed herein may be operated singly or in clusters as desired in a space vehicle. Additionally, ion engines may be positioned on the space vehicle so as to provide navigation and direction of travel of the vehicle. The ion engine of this invention will provide easily adjustable, small acceleration levels for use in attitude control. The ion engine of this invention will provide propulsive power which can be used to alter a circular satellite orbit to a parabolic orbit.

The ion engine of this invention may be incorporated in a space vehicle which combines chemical or nuclear rocket engines with ion engines. The high-thrust chemical rocket boosts the ion rocket into an initial orbit from which the ion engine will maintain the rocket in position and orbit.

Although this invention has been described and illustrated in detail, it is to be clearly understood that the same is by way of illustration and example only and is not to be taken by way of limitation, the spirit and scope of this invention being limited only by the terms of the appended claims.

I claim:

1. In a propulsion system for application to an outer space vehicle, a source of propellant, a source of electrical energy, a thrust chamber having means connected to receive propellant from said propellant source and said electrical energy source for generating ions, thrust means in said thrust chamber constructed and arranged adjacent to said ion generating means and operatively connected to said electrical energy source for extracting said ions from said thrust chamber at a predetermined velocity whereby thrust is developed, and means responsive to the particle output of said thrust means for controlling the supply of propellant from said propellant source and for controlling electrical energy from said energy source to said ion generating means and said thrust means whereby the desired amount of thrust developed from said chamber may be controlled.

2. In a propulsion system for application to an outer space vehicle, a source of propellant, a source of electrical energy, a thrust chamber having means connected to said propellant source and said electrical energy source for generating plasma, said plasma including atoms, ions, and electrons, thrust means in said thrust chamber constructed and arranged adjacent to said generating means and operatively connected to said electrical energy source for extracting said plasma from said thrust chamber at a predetermined velocity whereby thrust is developed, and means responsive to said atoms for controlling the supply of propellant and for controlling electrical energy to said generating means and said thrust means whereby the desired amount of thrust developed from said chamber may be controlled.

3. The combination recited in claim 2 wherein said thrust chamber includes means operatively connected to said source of electrical energy for emitting electrons from said thrust chamber to be combined with said ions extracted from said thrust chamber.

4. In an electrical propulsion system for application to an outer space vehicle, a source of ion propellant, a source of electrical energy, a thrust chamber having a thrust end and a discharge end, said thrust chamber rectangularly constructed symmetrically about a thrust axis, an ionizing electrode in said thrust chamber connected to said propellant source and a first high potential terminal of said electrical source for generating ions, the thrust end of said ionizing electrode being formed with scalloped surfaces for directing ions toward a focal point, a focusing electrode in said thrust chamber operatively connected to a second high potential terminal of said electrical source and having a focal point adapted to receive and focus said ions from said ionizing electrode, an accelerating electrode in said thrust chamber operatively connected to a low potential terminal of said electrical source for accelerating said ions, a decelerating electrode in said thrust chamber operatively connected to said low potential terminal of said electrical source for decelerating said ions, an emitter electrode in said thrust chamber operatively connected to said low potential terminal of said electrical source for emitting electrons from said thrust chamber, said emitter electrode forming the discharge end of said thrust chamber, said focusing electrode, said accelerating electrode, said decelerating electrode, and said emitter electrode, consisting of a plurality of parallel equally spaced bars, the bars of said emitter electrode being shaped in the form of a teardrop for discharging said ions from said thrust chamber.

5. In a propulsion system for use in an outer space vehicle, a source of propellant, a source of electrical energy, a thrust chamber, ionizing electrode means in said thrust chamber connected to said propellant source and a first high potential terminal of said electrical source for generating plasma, said plasma including atoms, ions, and electrons, focusing electrode means in said thrust chamber operatively connected to a second high potential terminal of said electrical source for focusing said plasma, and accelerating electrode means in said thrust chamber operatively connected to a low potential terminal of said electrical source for accelerating said plasma, and decelerating electrode means in said thrust chamber operatively connected to said low potential terminal of said electrical source for decelerating said plasma.

6. In a thrust generating device for application to an outer space vehicle, a source of ion propellant, a source of electrical energy, a thrust chamber having a thrust end and a discharge end, said thrust chamber rectangularly constructed symmetrically about a thrust axis, an ionizing electrode in said thrust chamber connected to said propellant source and a first high potential terminal of said electrical source for generating ions, said ionizing electrode forming the thrust end of said thrust chamber, a focusing electrode in said thrust chamber operatively connected to a second high potential terminal of said electrical source for focusing said ions, an accelerating electrode in said thrust chamber operatively connected to a low potential terminal of said electrical source for accelerating said ions, an emitter electrode in said thrust chamber operatively connected to said low potential terminal of said electrical source for emitting electrons from said thrust chamber, said emitter electrode forming the discharge end of said thrust chamber, a decelerating electrode in said thrust chamber operatively connected to said low potential terminal of said electrical source for decelerating said ions, said decelerating electrode being spaced between said accelerating electrode and said emitter electrode, said focusing electrode, said accelerating electrode, and said emitter electrode being mutually spaced from said ionizing electrode in the direction of said discharge end.

References Cited by the Examiner
UNITED STATES PATENTS

| | | | |
|---|---|---|---|
| 1,809,115 | 6/1931 | Goddard | 303—230 |
| 2,677,778 | 5/1954 | Baker | 313—38 |
| 2,736,809 | 2/1956 | Bacon | 250—41.9 |
| 2,754,442 | 7/1956 | Boutry | 313—63 |
| 2,880,337 | 3/1959 | Langmuir | 313—63 |

OTHER REFERENCES

"Reactors in Flight," Engineering, vol. 185, No. 4799, Feb. 28, 1958, p. 269.

"Atomic, Ionic, and Photo Rockets," Aviation Age, November 1956, pp. 76, 77.

Nucleonics, vol. 16, No. 7, July 1958, pp. 73–75.

The Journal of Astronautics, vol. 3, No. 2, summer, 1956, pp. 33–36.

MARK NEWMAN, *Primary Examiner*.

SAMUEL LEVINE, *Examiner*.

D. J. BARNARD, C. R. CROYLE, R. D. BLAKESLEE, *Assistant Examiners*.